United States Patent [19]

Ward, II

[11] Patent Number: 4,881,631

[45] Date of Patent: Nov. 21, 1989

[54] BREAKOVER HANDLE FOR PARKING METER

[75] Inventor: Seth Ward, II, Little Rock, Ark.

[73] Assignee: POM Incorporated, Russellville, Ark.

[21] Appl. No.: 204,352

[22] Filed: Jun. 9, 1988

[51] Int. Cl.$^4$ ............................ F16D 3/00; G05G 1/00
[52] U.S. Cl. ........................................ 194/228; 74/553; 464/36; 464/38
[58] Field of Search .................... 74/528, 545, 553; 464/36, 38, 39; 368/90; 70/422; 194/225–228

[56] References Cited

U.S. PATENT DOCUMENTS

| | | | |
|---|---|---|---|
| 1,516,152 | 11/1924 | Dumont | 70/422 |
| 1,683,715 | 8/1924 | Erban | 464/38 |
| 2,603,288 | 7/1952 | Sollenberger | 368/90 |
| 3,050,923 | 8/1962 | Sanderson | 464/39 |
| 3,082,643 | 7/1960 | Grassi | 74/553 |
| 3,662,628 | 5/1972 | Schnepel | 464/36 |
| 4,386,689 | 6/1983 | Kato | 464/36 |
| 4,515,037 | 5/1985 | Block | 74/553 |
| 4,571,111 | 2/1986 | Keogh | 74/553 |
| 4,679,420 | 7/1987 | Yang | 70/422 |

FOREIGN PATENT DOCUMENTS 502403 11/1954 Italy ........................................ 368/90

Primary Examiner—Gary L. Smith
Assistant Examiner—Flemming Saether
Attorney, Agent, or Firm—Hill, Van Santen, Steadman & Simpson

[57] ABSTRACT

A parking meter actuator handle is provided with a breakaway device comprising a detent disposed between first and second relatively rotatable parts. The detent is pre-loaded in a pair of aligned recesses but accommodates displacement in response to a breakaway torque to protect the parking meter against vandalism.

1 Claim, 1 Drawing Sheet

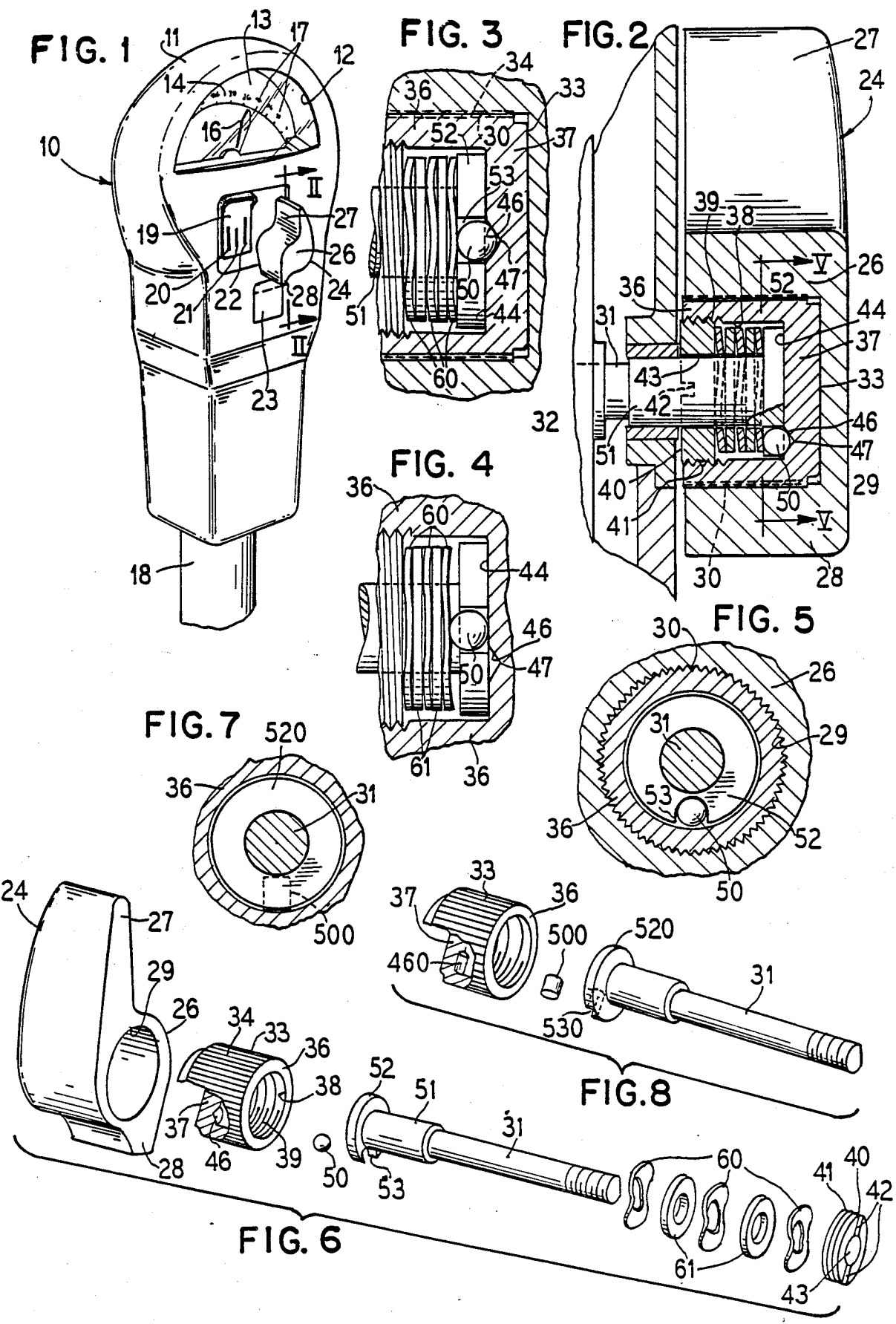

BREAKOVER HANDLE FOR PARKING METER

BACKGROUND OF THE INVENTION

1. Field of the Invention

This invention relates generally to parking meters and more particularly to a breakaway means for the actuating handle of an angularly displaceably type used in a parking meter.

2. The Prior Art

Parking meters are generally provided with an angularly displaceable actuating handle which is constructed and arranged to be gripped by the hand of a user. For example, a handle which can be grasped in the fingers of a user is provided so that after coins have been deposited, the handle can be turned to set the time on the meter and actuate the other mechanism within the container formed by the meter housing thereby to initiate the action of timer mechanisms which regulate the operation of the meter.

Parking meters are susceptible to extremely difficult environmental operating conditions, particularly at the hands of vandals who seek to thwart the effective and efficient operation of the meter or who purposely inflict damage upon the mechanism. For example, it is not at all unusual for vandals to use mechanical aids of one kind or another for purposes of applying excessive torques to the actuating handle in an effort to distort the operating mechanism of the meter or in an effort to actuate the operating mechanism of the meter without making a proper deposit of the necessary coinage.

SUMMARY OF THE INVENTION

According to the principles of the present invention, first and second rotatable actuator handle parts are provided with a break away means therebetween. More specifically, a detent is disposed between the first and second parts and is disposed to cooperate with first and second recesses formed in the respective parts. Thus, by providing a biasing means for loading the detent into one of the recesses, displacement of the detent out of the one recess in response to a breakaway torque applied between the handle parts will prevent destruction of the operating mechanism by allowing the detent to rotate through 360° until it once again enters the recess from which it has been forceably displaced.

DESCRIPTION OF THE DRAWINGS

FIG. 1 is a perspective view of a parking meter embodying a rotatable actuating handle embodying the principles of the present invention.

FIG. 2 is a cross-sectional view fragmentary in part with parts broken away showing additional details of the present invention.

FIG. 3 is a fragmentary somewhat enlarged view showing the detent of the break away means in one position of alignment wherein the parts of the handle assembly are locked in firm assembly with one another and in co-rotatable relationship.

FIG. 4 is a view similar to FIG. 3 but showing the detent in a displaced position resulting from the application of excessive force to the actuating handle.

FIG. 5 is a fragmentary cross-sectional view taken on the line V—V of FIG. 2.

FIG. 6 is an exploded view showing additional details of construction of the breakaway means of the present invention.

FIG. 7 is a fragmentary cross-sectional view showing a modified detent construction in accordance with the principles of the present invention; and FIG. 8 is a fragmentary exploded view somewhat similar to FIG. 6 but showing the additional details of the modified detent of FIG. 7.

DESCRIPTION OF THE PREFERRED EMBODIMENTS

A parking meter embodying the principles of the present invention is shown generally at 10 and comprises a housing 11 having a window 12 covered with a transparent enclosure such as glass or plastic 13 and through which may be viewed a calibrated time dial 14 across which moves an arrow 16 over an array of indicia 17 calibrated in time increments to show the amount of time remaining for which the user has paid the necessary stipend.

The housing is mounted on a post or stanchion 18 and has a coin deposit fascia shown at 19 in which a plurality of coin slots 20, 21 and 22 are disposed so that coins of differing denominations may be deposited in the meter depending on the needs of the user. A coin return chute is shown at 23. An actuating handle in accordance with the principles of the present invention is shown generally at 24, the details of which are more particularly shown in the cross-sectional view of FIG. 2.

Referring now to FIG. 2 and FIG. 5 in connection with FIG. 1, it will be noted that the actuating handle 24 has an enlarged central hub portion 26 from which extend two reduced radially formed arm portions 27 and 28. Extending in from one side of the center hub portion 26 is a cup shaped recess 29 formed with knurling 30. The actuating handle 24 may conveniently comprise a dicast part made of an appropriate alloy which lends itself to dicasting.

In accordance with the principles of this invention, a special breakaway means is provided between the handle part 24 and a shaft part 31 which is adapted to be connected to a point of utilization, namely, an operating mechanism 32 of the parking meter.

More specifically, the breakaway means comprises a cylindrical cup shaped receptor element shown generally at 33 and comprising a cup shaped member made of hardened steel which is knurled on its outer peripheral surface as at 34, thereby to permit a press fit of the receptor 33 into the recess 29 so that the knurling on the external surface of the receptor shown at 34 will cooperate with the knurling 30 on the inner surface of the recess 29 and locking the receptor and the receptor 33 and the handle 24 in firm assembly with one another so that they will corotate.

The cup shaped receptor has a central axis with longitudinal side walls 36 which terminate in an end wall 37 intersecting the axis.

The side walls 36 of the receptor 33 circumscribe a recess 38 and the inner surface of which is threaded as at 39 to receive an externally threaded cap shown at 40 and having screw threads 41 on its outer peripheral surface. The end wall of the cap 40 is slotted as at 42 thereby to cooperate with a tool for screw threading the cap 40 into the receptor 33. An axially center hole 43 is provided in the cap to pass the end of the shaft part 31.

The bottom wall of the recess 38 provided by the end wall 37 forms a detent guide surface 44 in which is formed a first detent recess 46 disposed radially outwardly of the central axis. As shown in FIGS. 3 and 4, the first detent recess 46 may be somewhat conical in shape having sloping side walls terminating in an apex 47.

A detent 50 is provided which in the embodiment of FIGS. 1-6 is a ball or spherically shaped detent 50 sized and configured to be received in the recess 46.

The shaft part 31 has a radially enlarged hub portion 51 and on the end thereof is a radially outwardly extending flange 52 of discrete thickness so that the flange may be formed with a second recess 53 which receives and captivates the detent 50.

As is particularly shown in FIG. 6, there is a loading means provided for biasing and loading the flange 52 and the detent 50 against the camming surface 44 of the end wall 37 in the receptor 33. That loading means may comprise a pre-loaded spring means such as a plurality of wave springs 60 between which is interposed washers 61. Thus, in the embodiment of FIG. 6, for example, there are three wave springs 60 and two washers 61. One wave spring will be bottomed against the flange 52 while the other wave spring at the end of the assembly will be engaged against the end wall of the cap 40. The wave spring also serves to limit the axially movement of the detent 50 in the slot or recess 53 formed in the flange 52.

By turning the cap 40 into the threaded assembly with the receptor 33, the loading means provided by the wave springs 60 will bias and engage the detent 50 in the recess 46 with such a holding force that normally applied torque on the actuating handle 24 will rotatably drive the shaft part 31 for operating the actuating mechanism 32 in a normal mode of operation. However, if an abnormal torque is applied to the actuating handle 24, the detent 50 will be displaceable axially against the wave springs 60 and will move longitudinally in the recess or slot 53 so that it is displaced from the locking position shown in FIG. 3 whereupon the detent 50 will ride on the camming surface 44. When engaged against the camming surface 44, the actuating handle 24 will rotate relative to the shaft part 31 until the detent 50 and the actuating handle 24 have moved through a relative displacement arc of 360° whereupon the detent 50 will again reseat itself into the recess 46 and will condition the actuating handle 24 for normal operation of the parking meter.

There is thus provided a breakaway means which safeguards the parking meter against application of excessive turning torque on the actuating handle 24 to the detrimental damage of the expensive mechanism within the parking meter.

It will be understood that the detent 50 need not be ball shaped or spherically shaped as shown in FIGS. 1-6 but could partake of other geometric shapes. For example, as shown in FIG. 7, or in another form of the invention as illustrated, like parts are numbered with like numerals. However, there is shown a detent 500 which comprises a cylindrical roller which is captured in a correspondingly shaped semi-cylinder recess 530 in a flange 520. The detent 500 is normally loaded into a correspondingly or complementary shaped recess 460 formed in the end wall 37 of the receptor 33.

Although minor modifications might be suggested by those versed in the art, it should be understood that I wish to embody within the scope of the patent warranted hereon all such modifications as reasonably and properly come within the scope of my contribution to the art.

I claim as my invention:

1. A parking meter comprising:

a housing having a substantially open viewing region;

a coin operated timing mechanism disposed in said housing having coin slots for accepting coins therein and a calibrated display of indicating the amount of time corresponding to the monetary value of the inserted coins, said calibrated display viewable in said substantially open viewing region;

a shaft connected to said coin operated timing mechanism and extending along a longitudinal axis to the exterior of said housing and terminating in a radially enlarged flange having a first detent recess therein comprising a slotted aperture extending through said flange and spaced radially from said longitudinal axis and sized to accommodate movement of a detent member only in a direction parallel to said longitudinal axis but to captivate the detent for rotatable movement with the flange;

a cylindrical cup shaped receptor having an end wall intersecting the central axis thereof and a side wall extending axially and longitudinally with respect to said central axis for receiving said flange of said shaft, said end wall having a single second recess spaced radially inwardly of said side wall and selectably alignable with said first recess;

screw threads formed in the interior of said sidewall;

a spherically shaped detent member constructed and arranged to be complemental in size and shape for reception within said first and second recesses to join said shaft and said receptor in co-rotatable relationship with one another;

a cap having threaded sidewalls for engaging the screw threads in the interior of said sidewall of said receptor and an aperture in the center thereof constructed and arranged to pass said shaft therethrough;

spring means comprising a series of spring washers disposed radially about said shaft between the endwall of said receptor and said cap for bias loading said flange of said shaft against said endwall of said receptor; and a manual activating handle having an aperture for receiving said receptor, interfitting knurling means on said handle and said receptor locking them together in a co-rotatable relationship with said handle in a pre-aligned orientation relative to said viewing region, said handle adapted for gripping by a human hand so that an operator of said parking meter upon turning said handle will apply normal torque to said receptor and said detent thereby to turn said shaft for activating said coin operated timing mechanism, the application of excessive abnormal torque to said manual activating handle displacing said detent member longitudinally out of said second recess into said first recess against said end wall and against the bias of said spring means and allowing said handle and receptor to turn together without simultaneously turning said shaft thereby allowing said handle, said receptor and said detent to turn through a rotation of only 360 degrees before said detent once against engages said second recess so that said handle will return and remain in said pre-aligned orientation;

whereby the actuating handle is once again conditioned for normal action of the parking meter from its pre-aligned orientation.

* * * * *